United States Patent
Maxon et al.

(10) Patent No.: US 7,144,350 B2
(45) Date of Patent: Dec. 5, 2006

(54) METHOD AND DEVICE FOR MONITORING THE ERRORS OF AN ELECTRONIC CONTROL UNIT OF AN AUTOMATED TRANSMISSION THAT IS SITUATED IN THE DRIVE TRAIN OF A MOTOR VEHICLE

(75) Inventors: Andreas Maxon, Karlsruhe (DE); Jürgen Eich, Bühl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 156 days.

(21) Appl. No.: 10/922,764

(22) Filed: Aug. 20, 2004

(65) Prior Publication Data
US 2005/0079952 A1    Apr. 14, 2005

Related U.S. Application Data

(63) Continuation of application No. PCT/DE03/04180, filed on Dec. 18, 2003.

(30) Foreign Application Priority Data
Dec. 23, 2002    (DE) ................. 102 60 870

(51) Int. Cl.
*B60W 10/04*    (2006.01)
(52) U.S. Cl. .................................... 477/107
(58) Field of Classification Search ............. 477/107, 477/109, 906
See application file for complete search history.

(56) References Cited

U.S. PATENT DOCUMENTS

| | | | | |
|---|---|---|---|---|
| 5,103,692 | A * | 4/1992 | Shimanaka et al. | 477/109 |
| 5,117,791 | A | 6/1992 | Chan et al. | |
| 5,738,606 | A * | 4/1998 | Bellinger | 477/111 |
| 5,948,037 | A * | 9/1999 | Muraki | 701/114 |
| 6,168,546 | B1 * | 1/2001 | Loffler et al. | 477/109 |
| 6,220,219 | B1 * | 4/2001 | Wadas et al. | 123/352 |
| 6,511,399 | B1 * | 1/2003 | Mc Collum Etchason et al. | 477/107 |
| 6,656,087 | B1 * | 12/2003 | Runde et al. | 477/107 |

FOREIGN PATENT DOCUMENTS

| | | |
|---|---|---|
| EP | 0449424 A2 | 10/1991 |
| GB | 2315132 A | 1/1998 |

* cited by examiner

Primary Examiner—Dirk Wright
(74) Attorney, Agent, or Firm—Simpson & Simpson, PLLC

(57) ABSTRACT

A method and device for error control procedure of an electronic control device of an automatic transmission, especially an automated shift transmission, disposed within the drive train of a motor vehicle, wherein the control device in the error-free state produces signals calling for predetermined torques from an engine under predetermined operating conditions according to which the torque produced by the engine is controlled, in which method a requested value that is a function of the requested torque is compared to a predetermined limit value and an error signal is produced if the requested value exceeds the limit value.

14 Claims, 2 Drawing Sheets

METHOD AND DEVICE FOR MONITORING THE ERRORS OF AN ELECTRONIC CONTROL UNIT OF AN AUTOMATED TRANSMISSION THAT IS SITUATED IN THE DRIVE TRAIN OF A MOTOR VEHICLE

CROSS-REFERENCE TO RELATED APPLICATIONS

This application is filed under 35 U.S.C. § 120 and § 365(c) as a continuation of International Patent application PCT/DE03/04180, filed Dec. 18, 2003 and published Jul. 15, 2004, which application is incorporated herein by reference. This application also claims priority of German Patent Application No. 102 60 870.9, filed Dec. 23, 2002, which application is incorporated herein by reference.

BACKGROUND OF THE INVENTION

The invention relates to a method and a device for error control procedure of an electronic control device of an automatic transmission, especially an automated shift transmission, disposed within the drive train of a motor vehicle.

Automatic transmissions, especially automated shift transmissions, are increasingly used in motor vehicles not just for the sake of driving comfort, but also for the sake of reductions in fuel consumption that can be achieved with them.

FIG. 2 shows a block diagram of a vehicle drive train equipped with an automated shift transmission.

An internal combustion engine 4 is connected via a clutch 6 to a shift transmission 8 from which a drive shaft 10 leads to driven wheels of the motor vehicle.

A power control element 12, for example, a throttle flap in a spark ignition engine or control rod in a diesel engine, that is actuated by an actuator 14 is used to control engine power. An actuator 16 is provided to actuate clutch 6. Actuators, which together are designated as 18, are used to actuate shift transmission 8.

Furthermore, the vehicle has an accelerator pedal 20 and an actuation unit 22 for selecting different gears or shifting programs for the actuation of shift transmission 8.

A transmission control unit 24—which has a microprocessor 26 with program memory 28 and data memory 30 and whose inputs 32 are connected to at least some of sensors 34, 36, 38, 40, 42, 46, 48 and 50 to determine the position of actuation unit 22 of power control element 12, the engine speed, the speed of a transmission input shaft, the speed of the drive shaft, the position of the actuators 18 of transmission 8, the position of accelerator pedal 20 and the position of clutch actuator 16—is used to control actuators 16 and 18.

The transmission control device 24 is connected to an engine control device 52 via a bus 54 whose outputs are connected to actuator 14 as well as a fuel supply system of engine 4 and in some cases an ignition as well as in some cases additional control rods of engine 4 and whose inputs are joined to some of the aforementioned actuators and in some cases additional actuators.

The division of hardware and software scopes may differ between controllers 24 and 52.

Structure and function of the system are known in and of themselves and therefore are not explained in further detail. The shift operations of shift transmission 8, i.e., of clutch actuator 16 and actuators 18 are controlled in particular as a function of the position of accelerator pedal 20 or the position of power control element 12, which may be linked directly with accelerator pedal 20 or actuated completely electronically, and the speed of drive shaft 10 and/or the engine speed, where a complex program stored in program memory 28 of transmission control 24 determines the particular gear to be engaged or the sequence of the shift operations. At least during a shift operation, the torque to be output by the engine is determined not just by the position of accelerator pedal 20, but also by the program controlled via transmission control device 24, because when disengaging clutch 6 for a gear change the engine torque in most cases must first be backed off in order to increase again when engaging the clutch after shifting the gear, so that a comfortable gear change is ensured. The intervention in the engine torque may occur in this case directly through an appropriate electronically controlled actuation of the power control element 12, via an additional power control element 12 or by intervention in the ignition.

If, because of errors in control device 24, a torque is called for by engine 4 that is above the torque desired by a driver, the vehicle, against the wishes of the driver, may accelerate, which leads to safety-critical situations.

OBJECTS OF THE INVENTION

The object of the invention is to provide a remedy for the aforementioned problem.

SUMMARY OF THE INVENTION

This objective is achieved by employing a method for the error control procedure of an electronic control device of an automatic transmission, especially an automated shift transmission, disposed within the drive train of a motor vehicle, the control device in the error-free state generating signals requiring predetermined torque values from a drive engine at predetermined intervals under predetermined operating conditions, according to which the torque generated by the engine, in which method a requested value that is a function of the requested torque is compared to a predetermined limit value and an error signal is generated if the requested value exceeds the limit value.

In an advantageous embodiment of the method, the requested value corresponds to the sum of torques requested during a defined period of time.

Advantageously, the limit value depends on the position of an accelerator pedal.

The limit value depends in an advantageous manner on the gear that is selected. Therefore, an intervention that increases torques, for example, may be prohibited for specific gears.

The limit value may also be a function of speed (undesired acceleration by 5 km/hr at v=10 km/hr is clearly more unpleasant than at v=150 km/hr).

In a preferred embodiment of the method, the comparison is made only when predetermined operating states are present.

In a device for the error control procedure of an electronic control device of an automatic transmission, especially an automated shift transmission, disposed within the drive train of a motor vehicle, the control device having a microprocessor as well as program and data memories, being connected to sensors for the detection of operating parameters of the drive train, being linked to at least one actuator for controlling the gear ratio of the transmission and generating signals calling for predetermined torques from an engine when certain operating states are present, especially during the course of a gear change, and according to which the torque generated by the engine is controlled, the control device includes a device for carrying out each of the aforementioned methods.

BRIEF DESCRIPTION OF THE DRAWINGS

The invention is explained below in relation to diagrammatic exemplary drawings and with additional details.

In the drawing.

DETAILED DESCRIPTION OF THE PREFERRED EMBODIMENT

Figure 1:
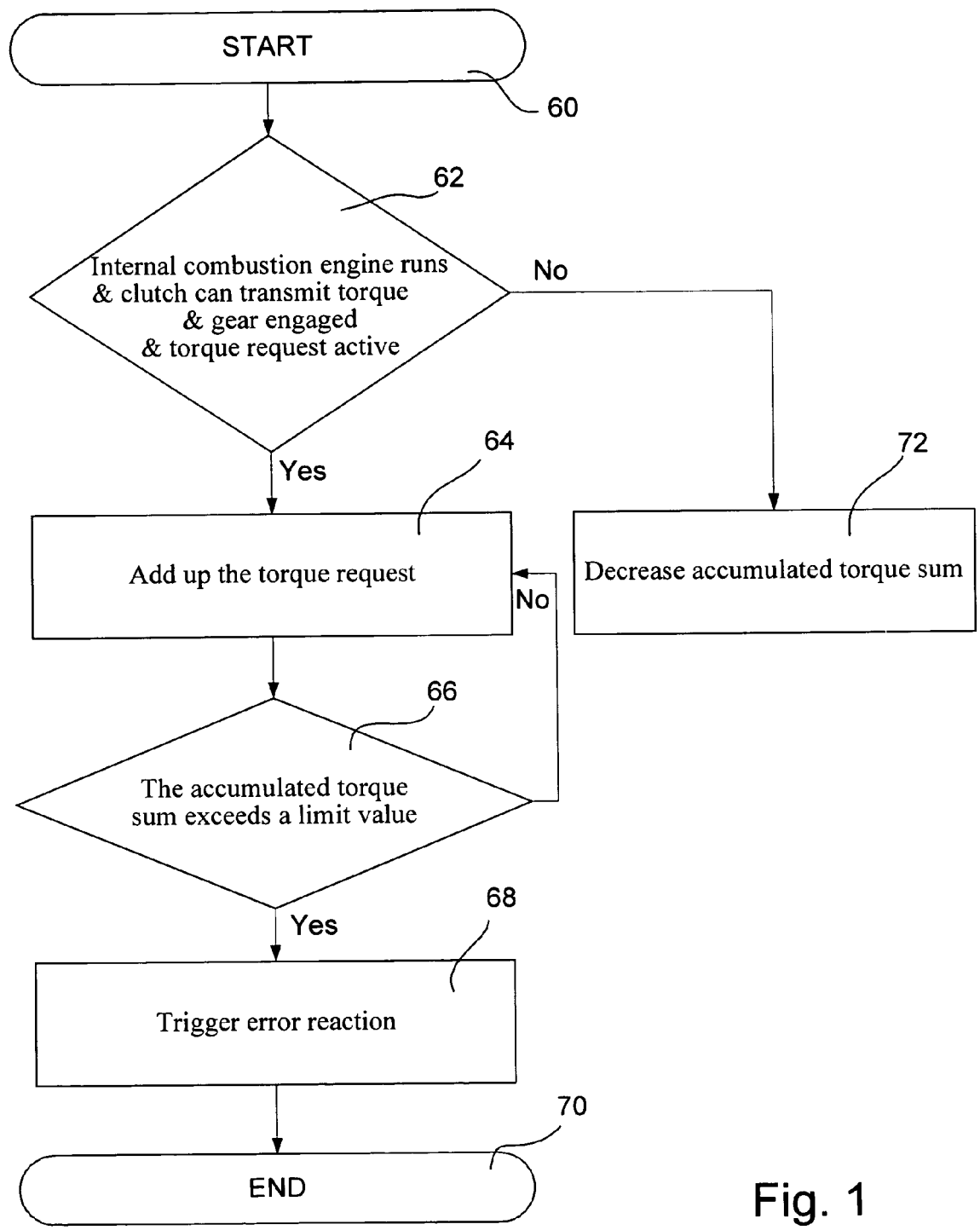
FIG. 1 is a flow diagram for explanation of an example of the method of the invention.
Figure 2:
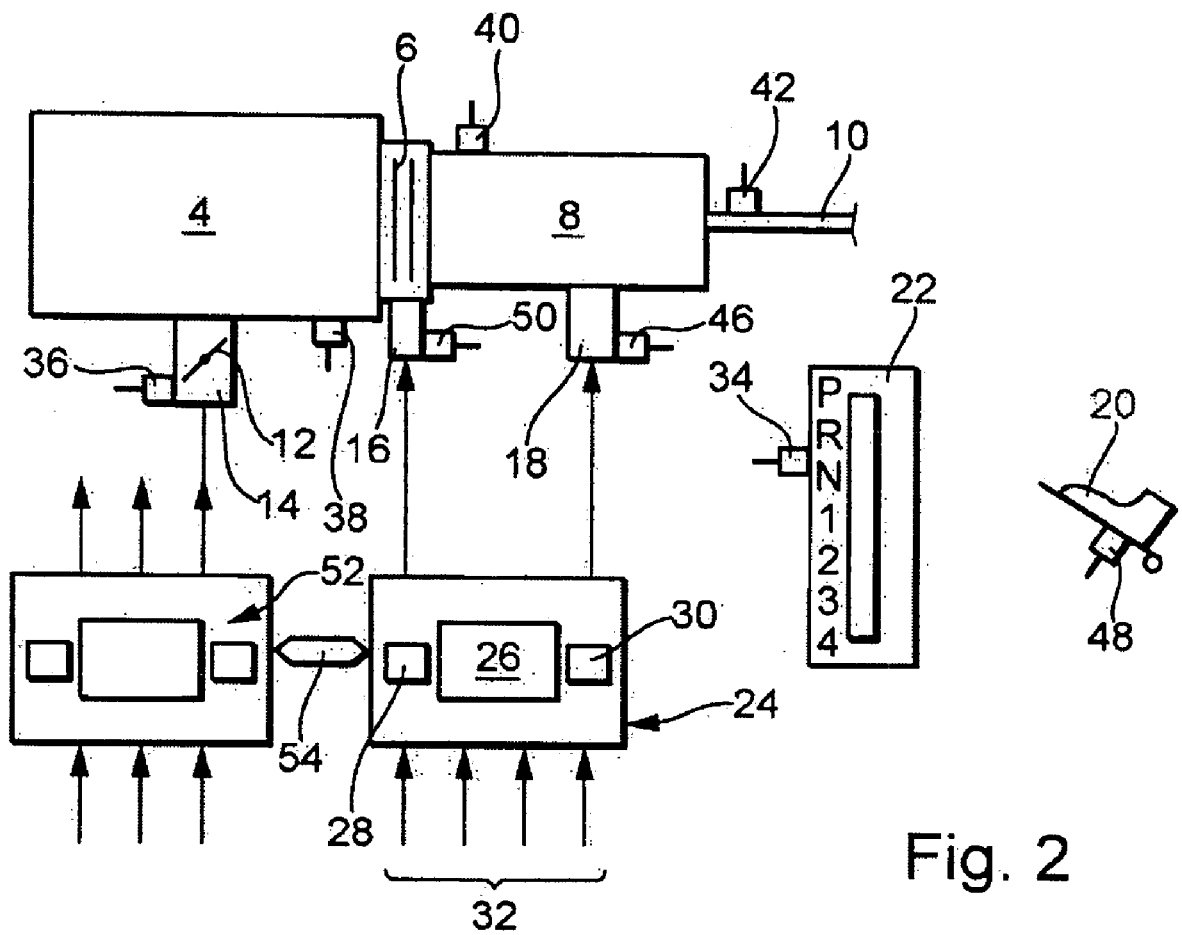
FIG. 2 shows the previously explained block diagram of the vehicle drive train that is known in its structure.

According to FIG. 1, the monitoring program of the present invention is started in step 60, for example, after the ignition is switched on. In step 62 a check is made of whether predetermined conditions are present, in the illustrated example, whether engine 4 (FIG. 2) is running, clutch 6 is situated in a state in which it can transmit a torque, a gear is engaged and the program stored in control device 24 for sending a signal that calls for an engine torque is active. If in step 62 it is determined that the aforementioned conditions are satisfied, in step 64 the torques corresponding to the pulse frequency of the system at each clock pulse are added up, and in step 66 there is a continuous determination of whether the cumulative value of the requested torques, which represents a requested value, exceeds a limit value. If this is not the case, the summation continues until the conditions of step 62 are present. If the limit value is exceeded, an error signal is triggered in step 68 that leads to an error reaction in which, for example, the requested torque is backed off by a restarting of transmission control device 24. Then the program ends in step 70. If the conditions of step 62 are no longer present, then in step 72 the accumulated torque sum (step 64) is reduced step by step down to zero.

The method described in the example may be altered in many different ways.

The conditions checked in step 62 may be different. In the extreme case, it is only possible to check whether transmission control device 24 is requesting a torque.

In step 64 the minimum could also be added up from transferable clutch torque and engine torque instead of the requested torque.

In step 64 the torques do not inevitably have to be added up. On the contrary, the requested torque may be compared with a torque that is a function of the position of accelerator pedal 20 and possibly other operating parameters and can directly form the limit value (step 66).

Depending on the algorithms that are running, the torque request may be that merely an increase of the engine torque is requested that when transmission control device 24 is in working order goes back to zero if the required torque is present, (which may be determined, for example, by the position of the power control element 12 and the speed of the internal combustion engine) or a specific level of engine torque is requested. The summation or integration in step 64 has the advantage that high torque demands lasting for a short time can be recognized as dangerous just as low torque demands lasting for a long time, both of which can lead to dangerous conditions.

The limit value that must be exceeded in step 66 in order for an error signal to be triggered may amount to a multiple of the maximum engine torque in the summation. The limit value is advantageously a function of the position of accelerator pedal 20. In the simplest case, it is thereby ensured that the engine torque requested by transmission control device 24 does not exceed the engine torque corresponding to the position of accelerator pedal 20. The limit value may depend on additional variables, for example, from the selected shift program, because short-term high engine torques are frequently required for smooth shifting, whereupon the engine, for example, when shifting into a lower gear, runs at a correspondingly higher speed once engaged.

The invention is usable for automated shift transmissions of any design but may also be used for its translation of continuously variable transmissions if the corresponding control devices for improvement of the shifting dynamics in non-stationary states affect the engine torque.

The following patent claims are proposed formulations without prejudice to the achievement of further patent protection. The applicant reserves the right to submit claims for further combinations of features only described in the description and/or the drawings. References used in dependent claims refer to the further development of the subject matter of the independent claim via the features of the particular dependent claims; they are not to be understood as a renunciation of achieving independent protection for the combination of features for the dependent claims. Since the subject matter of the dependent claims may constitute separate and independent inventions in relation to the state-of-the-art on the priority date, the applicant reserves the right to make them the subject matter of independent claims or divisional applications. Furthermore, they may also contain independent inventions that have a design that is independent of the subject matter of the preceding dependent claims.

The embodiments are not to be understood as a restriction of the invention. Rather, numerous amendments and modifications are possible within the context of the current disclosure, especially those variants, elements and combinations that one skilled in the art may learn, for example, by combining individual ones together with those in the general description and embodiments in addition to features and/or elements or methodological steps described in the claims and contained in the drawings with the aim of achieving the objective or advantages and leading to a new subject matter or new methodological steps or sequences of steps via combinable features.

What is claimed is:

1. A method for the error control procedure of an electronic control device (24) of an automatic transmission (6, 8), especially an automated shift transmission, disposed within the drive train of a motor vehicle, wherein the control device in the error-free state produces signals calling for an increase in torques from an engine (4) during a gear shift according to which the torque produced by the engine is controlled, in which method a requested value that is a function of the requested torque is compared to a predetermined limit value and an error signal is produced if the requested value exceeds the limit value.

2. The method as described in claim 1, wherein the requested value corresponds to the sum of the torques requested during a defined period of time.

3. The method as described in claim 1, wherein the limit value is a function of the position of an accelerator pedal.

4. The method as described in claim 1, wherein the comparison occurs only when predetermined operating states are present.

5. A device for an error control procedure of an electronic control device (24) of an automated shift transmission (8)

and a clutch (6), disposed within a drive train of a motor vehicle, wherein the clutch is arranged to transmit torque directly from the engine to the transmission, the control device comprises a microprocessor (26) with program memory (28) and data memory (30) connected to sensors (34–50) for the detection of operating parameters of the drive train, said microprocessor is linked to at least one actuator (46, 50) to control a gear ratio of the transmission, and, when predetermined operating states are present, especially during the course of a gearshift operation, in an error-free state produces signals that call for predetermined torques from an engine (4) according to which torque produced by the engine is controlled.

6. The device recited in claim 5, wherein said device is operatively arranged to compare a requested value that is a function of the requested torque to a predetermined limit value and to produce an error signal if the requested value exceeds the limit value.

7. The device recited in claim 6 wherein the requested value corresponds to the sum of the torques requested during a defined period of time.

8. The device recited in claim 6 wherein the limit value is a function of the position of an accelerator pedal.

9. The device recited in claim 6 wherein the comparison occurs only when predetermined operating states are present.

10. A method for the error control procedure of an electronic control device (24) of an automatic transmission (6, 8), especially an automated shift transmission, disposed within the drive train of a motor vehicle, wherein the control device in the error-free state produces signals calling for predetermined torques from an engine (4) under predetermined operating conditions according to which the torque produced by the engine is controlled, in which method a requested value that is a function of the requested torque is compared to a predetermined limit value and an error signal is produced if the requested value exceeds the limit value and wherein the requested value corresponds to the sum of the torques requested during a defined period of time.

11. A system for controlling operation of a drive train, comprising a controller (24), wherein, the drive train includes an engine (4), an automated shift transmission (8), and a clutch (6) and wherein the clutch is arranged to transmit torque directly from the engine to the transmission and wherein the controller produces signals calling for predetermined torques from the engine under predetermined operating conditions according to which the torque produced by the engine is controlled, compares a requested value that is a function of the requested torque to a predetermined limit value, and produces an error signal if the requested value exceeds the limit value.

12. A method for the error control procedure of an electronic control device (24) of an automatic transmission (6, 8), especially an automated shift transmission, disposed within the drive train of a motor vehicle, wherein the control device in the error-free state produces signals calling for requested torques from an engine (4) in a mode of an engaged gear according to which the torque produced by the engine is controlled, in which method a requested value that is a function of the requested torque is compared to a predetermined limit value and an error signal is produced if the requested value exceeds the limit value and wherein the requested value corresponds to the sum of the torques requested during a defined period of time.

13. A device for an error control procedure of an electronic control device (24) of an automated shift transmission (8) and a clutch (6), disposed within a drive train of a motor vehicle, wherein the clutch is arranged to transmit torque directly from the engine to the transmission, the control device comprises a microprocessor (26) with program memory (28) and data memory (30) connected to sensors (34–50) for the detection of operating parameters of the drive train, said microprocessor is linked to at least one actuator (46, 50) to control a gear ratio of the transmission, and, when predetermined operating states are present, especially during the course of a gearshift operation, in an error-free state produces signals that call for predetermined torques from an engine (4) according to which torque produced by the engine is controlled, wherein said device is operatively arranged to compare a requested value that is a function of the requested torque to a predetermined limit value and to produce an error signal if the requested value exceeds the limit value and wherein the requested value corresponds to the sum of the torques requested during a defined period of time.

14. A device for an error control procedure of an electronic control device (24) of an automated shift transmission (8) and a clutch (6), disposed within a drive train of a motor vehicle, wherein the clutch is arranged to transmit torque directly from the engine to the transmission, the control device comprises a microprocessor (26) with program memory (28) and data memory (30) connected to sensors (34–50) for the detection of operating parameters of the drive train, said microprocessor is linked to at least one actuator (46, 50) to control a gear ratio of the transmission, and, when a gear is engaged, in an error-free state produces signals that call for predetermined torques from an engine (4) according to which torque produced by the engine is controlled.

* * * * *